(12) United States Patent  
Sugiyama

(10) Patent No.: US 12,531,294 B2  
(45) Date of Patent: Jan. 20, 2026

(54) BATTERY PACK, ELECTRIC TOOL, AND ELECTRIC VEHICLE

(71) Applicant: MURATA MANUFACTURING CO., LTD., Kyoto (JP)

(72) Inventor: Masaaki Sugiyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 478 days.

(21) Appl. No.: 18/116,072

(22) Filed: Mar. 1, 2023

(65) Prior Publication Data

US 2023/0207927 A1 Jun. 29, 2023

Related U.S. Application Data

(63) Continuation of application No. PCT/JP2021/043219, filed on Nov. 25, 2021.

(30) Foreign Application Priority Data

Dec. 3, 2020 (JP) .................. 2020-201185

(51) Int. Cl.
*H01M 10/658* (2014.01)
*B60L 50/64* (2019.01)
(Continued)

(52) U.S. Cl.
CPC ........... *H01M 10/658* (2015.04); *B60L 50/64* (2019.02); *H01M 10/613* (2015.04);
(Continued)

(58) Field of Classification Search
CPC ............. H01M 10/658; H01M 10/613; H01M 10/6235; H01M 10/625; H01M 10/643; H01M 10/6551; H01M 10/6555; H01M 10/653; H01M 10/655; H01M 10/6554; H01M 10/659; H01M 50/213;
(Continued)

(56) References Cited

U.S. PATENT DOCUMENTS

2011/0293986 A1 12/2011 Kozu
2019/0067655 A1* 2/2019 Nakamura .......... H01M 50/247

FOREIGN PATENT DOCUMENTS

JP 2002291670 A 10/2002
JP 2006107774 A 4/2006
(Continued)

OTHER PUBLICATIONS

Wakasaya , JP 2019085452, Espacenet Machine translation, 2019 (Year: 2019).*

(Continued)

*Primary Examiner* — Adam A Arciero
(74) *Attorney, Agent, or Firm* — K&L Gates LLP

(57) ABSTRACT

A battery pack having a high temperature is effectively cooled. The battery pack includes an exterior case, a battery, a battery holder, and a heat absorbing portion. The heat absorbing portion is configured to absorb heat by a phase change. The battery holder includes a first battery holder that holds an electrode portion of the battery and a second battery holder that surrounds a body portion of the battery. The second battery holder includes a pool portion. The heat absorbing portion is housed in the pool portion.

10 Claims, 18 Drawing Sheets

(51) Int. Cl.
  *H01M 10/613* (2014.01)
  *H01M 10/6235* (2014.01)
  *H01M 10/625* (2014.01)
  *H01M 10/643* (2014.01)
  *H01M 50/213* (2021.01)

(52) U.S. Cl.
  CPC ..... *H01M 10/6235* (2015.04); *H01M 10/625* (2015.04); *H01M 10/643* (2015.04); *H01M 50/213* (2021.01)

(58) Field of Classification Search
  CPC .... H01M 50/227; H01M 50/24; H01M 50/20; H01M 2220/20; H01M 2220/30; B60L 50/64; B60L 58/26; Y02E 60/10
  See application file for complete search history.

(56) References Cited

FOREIGN PATENT DOCUMENTS

| | | |
|---|---|---|
| JP | 2019085452 A | 6/2019 |
| WO | 2011064956 A1 | 6/2011 |

OTHER PUBLICATIONS

International Search Report of corresponding PCT application PCT/JP2021/043219, dated Jan. 25, 2022.

* cited by examiner

A

B

A

B

C

D

BATTERY PACK, ELECTRIC TOOL, AND ELECTRIC VEHICLE

CROSS REFERENCE TO RELATED APPLICATIONS

The present application is a continuation of PCT patent application no. PCT/JP2021/043219, filed on Nov. 25, 2021, which claims priority to Japanese patent application no. JP 2020-201185, filed on Dec. 3, 2020, the entire contents of which are incorporated herein by reference.

BACKGROUND

The present application relates to a battery pack, an electric tool, and an electric vehicle.

A technique for cooling a battery that generates heat has been proposed, for example, in which a heat storage material container containing a heat storage material as well as a battery is housed in a battery pack to make the heat storage material in the heat storage material container absorb heat generated by the battery.

SUMMARY

The present application relates to a battery pack, an electric tool, and an electric vehicle.

In the technique described in the Background, since the heat storage material container needs to be housed in the battery pack, the volume energy density of the battery pack decreases. Further, housing the heat storage material container in the battery pack causes an increase in size and weight of the battery pack.

Therefore, the present application relates to providing, in an embodiment, a battery pack that achieves effective cooling of a battery having a high temperature without causing a decrease in volume energy density of the battery pack, and provide an electric tool, and an electric vehicle.

In an embodiment, the present application provides a battery pack including an exterior case, a battery, a battery holder, and a heat absorbing portion. In the battery pack, the heat absorbing portion is configured to absorb heat by a phase change, the battery holder includes a first battery holder that holds an electrode portion of the battery and a second battery holder that surrounds a body portion of the battery, the second battery holder includes a pool portion, and the heat absorbing portion is housed in the pool portion.

According to an embodiment of the present application, a battery having a high temperature can be effectively cooled without causing a decrease in volume energy density of the battery pack. Note that the contents of the present application are not to be construed as being limited by the effect described in this specification.

DETAILED DESCRIPTION

Figure 1:
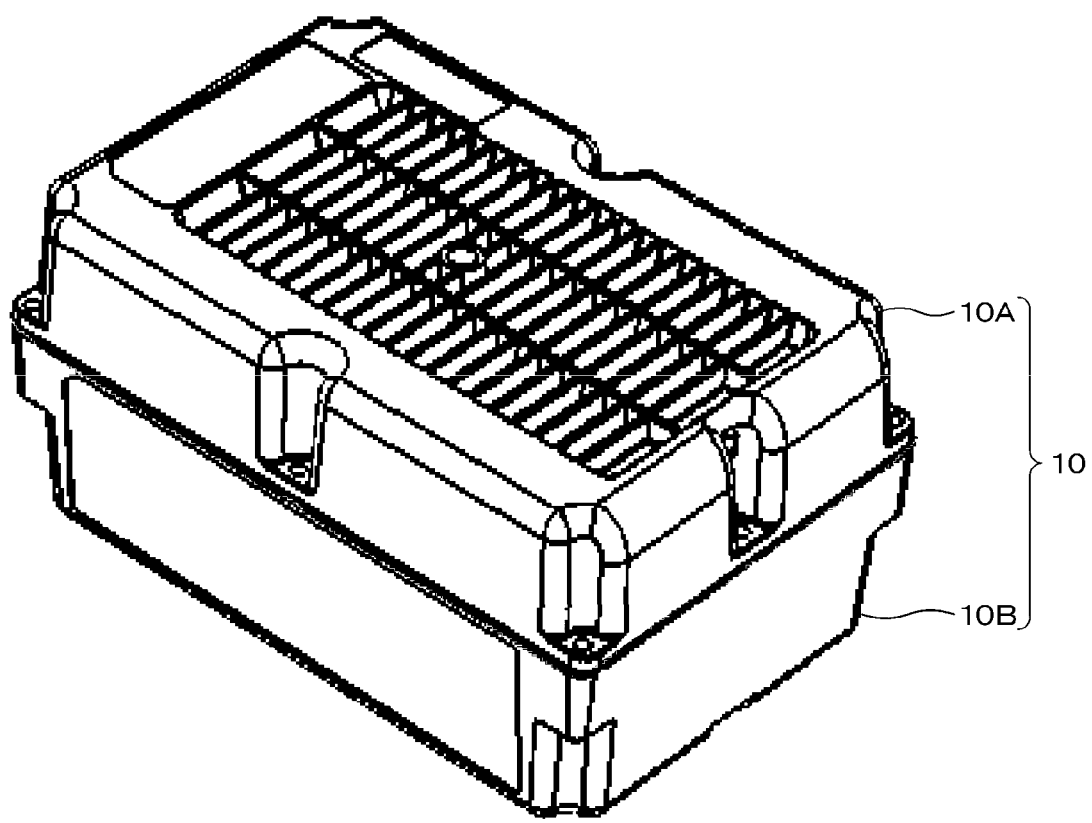
FIG. 1 is a diagram illustrating appearance of a battery pack according to an embodiment.

Hereinafter, an embodiment of the present application will be described in further detail including with reference to the drawings and one or more examples.

Note that the present application is, unless otherwise described, not intended to be limited to only the dimensions, materials, and shapes of the constituent members described herein, the relative configurations thereof, and the description of directions such as upward, downward, leftward, and rightward directions, which are considered as merely description examples. It is to be noted that sizes, positional relationships, and the like of the members illustrated in the respective drawings may be exaggerated for the clarity of description, and for preventing complicated illustrations, only some of reference numerals may be illustrated, or a part of the illustration may be simplified. Furthermore, in the following description, the same names and reference numerals represent the identical or same members, and redundant descriptions thereof will be appropriately omitted. Furthermore, for each element constituting the present application, an aspect may be employed such that one member also serves as multiple elements made of the same member, or conversely, the function of one member can be shared and achieved by a plurality of members.

FIG. 1 is a diagram illustrating appearance of a battery pack (battery pack 1) according to an embodiment. The battery pack 1 has an approximately box-shaped exterior case 10. The exterior case 10 is made of a resin, for example. The exterior case 10 includes an exterior upper case 10A having a lid shape and an approximately rectangular shape in top view, and an exterior lower case 10B having a case shape with an open upper surface. The exterior upper case 10A and the exterior lower case 10B are integrated by, for example, fastening using six fastening screws. An output positive electrode terminal and an output negative electrode terminal (not illustrated) are led out from the exterior case 10. The output positive electrode terminal and the output negative electrode terminal are connected to a load of the battery pack 1. Note that in a case where the battery pack 1 is charged, the output positive electrode terminal and the output negative electrode terminal are used as charging terminals.

Figure 2:
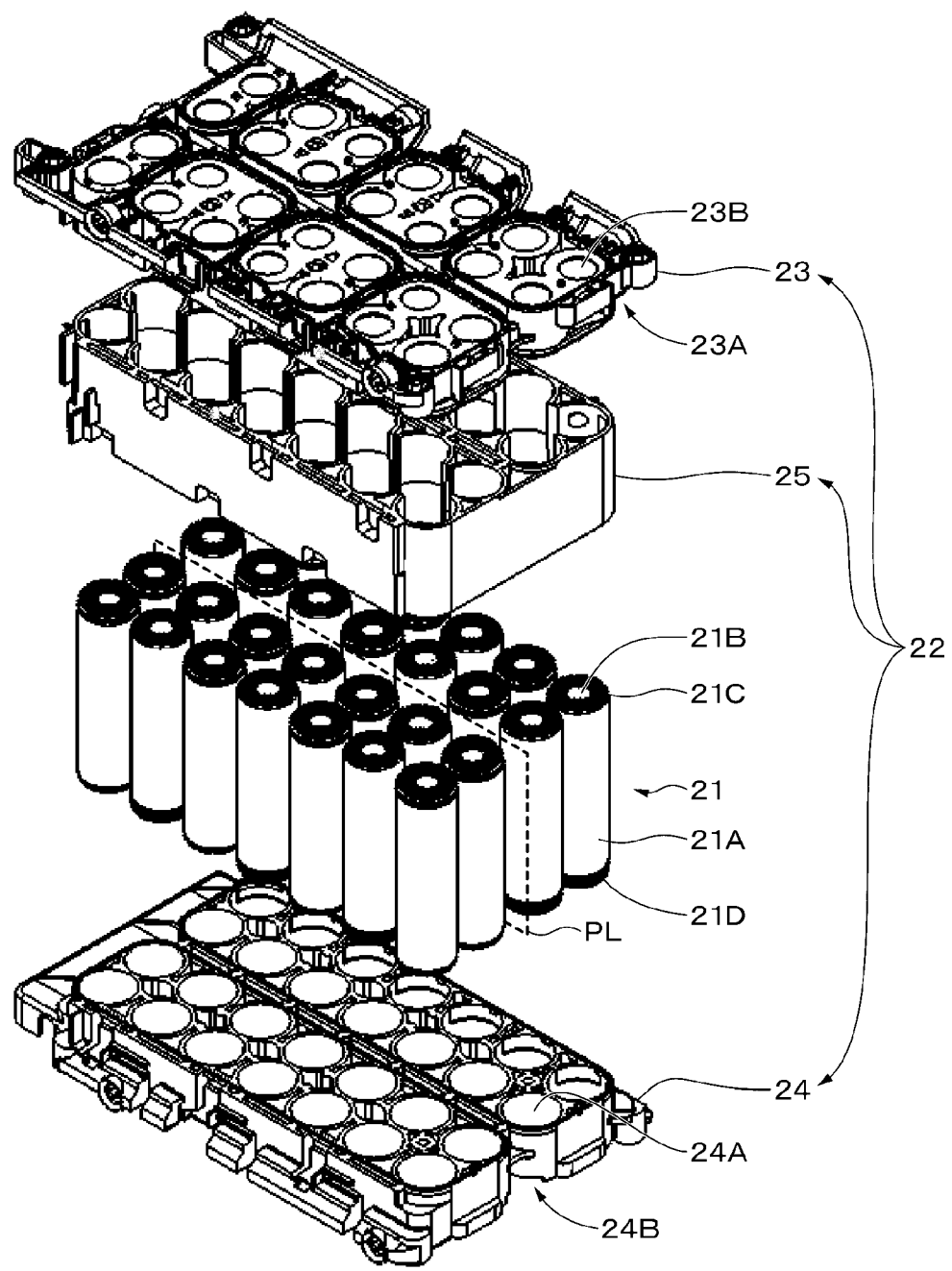
FIG. 2 is an exploded perspective view of a battery unit according to an embodiment.

A battery unit is housed in the exterior case 10 described above. FIG. 2 is an exploded perspective view of the battery unit (battery unit 20) according to an embodiment. The battery unit 20 includes a battery 21 and a battery holder 22 that houses and holds the battery 21. The battery holder 22 includes a top holder 23, a bottom holder 24, and a middle holder 25.

The battery 21 has one or a plurality of unit cells. For example, the battery 21 includes cylindrical lithium ion secondary battery cells 21A each having an electrode portion 21B at both ends. In an embodiment, the battery 21 includes 28 lithium ion secondary battery cells 21A, but the number and arrangement of the lithium ion secondary battery cells 21A can be changed as appropriate. The lithium ion secondary battery cells 21A each have a positive electrode terminal as an electrode portion 21B at one end, and a negative electrode terminal as an electrode portion 21B at the other end. In the following description, the positive electrode terminal or the negative electrode terminal is generally referred to as the electrode portion 21B as appropriate.

For example, the battery 21 is divided into groups each having the 14 lithium ion secondary battery cells 21A by a virtual plane PL illustrated in FIG. 2. In one group having the 14 lithium ion secondary battery cells 21A, the positive electrode terminals of the two lithium ion secondary battery cells 21A located at the most end (one end side) face upwards, for example, and the negative electrode terminals face downwards. The positive electrode terminals of the two lithium ion secondary battery cells 21A adjacent to the two lithium ion secondary battery cells 21A at the most end face, for example, downwards, and the negative electrode terminals face upwards. As described above, the lithium ion secondary battery cells 21A are arranged with polarity directions being alternate. Further, in the other group having the 14 lithium ion secondary battery cells 21A, the positive electrode terminals of the two lithium ion secondary battery cells 21A located at the most end (one end side) face downwards, for example, and the negative electrode terminals face upwards. The positive electrode terminals of the two lithium ion secondary battery cells 21A adjacent to the two lithium ion secondary battery cells 21A at the most end face, for example, upwards, and the negative electrode terminals face downwards. As described above, the lithium ion secondary battery cells 21A are arranged with polarity directions being alternate.

Further, in an embodiment, elastic members (an example of blocking portions) are disposed to respectively surround the electrode portions 21B of the lithium ion secondary battery cells 21A. For example, ring-shaped elastic members 21C are provided to respectively surround the vicinities of the electrode portions 21B located on the top holder 23 side of the lithium ion secondary battery cells 21A, and ring-shaped elastic members 21D are provided to respectively surround the vicinities of the electrode portions 21B on the bottom holder 24 side of the lithium ion secondary battery cells 21A. In an embodiment, the elastic members 21C and the elastic members 21D correspond to an example of a first elastic member.

The battery holder 22 is made of, for example, a resin. The battery holder 22 holds the battery 21 at a predetermined position and provides insulation between the lithium ion secondary battery cells 21A. The middle holder 25 included in the battery holder 22 is disposed to be sandwiched between the top holder 23 and the bottom holder 24. Note that the terms "top", "bottom", and "middle" are used to make a distinction for convenience of description, and thus the top holder 23 does not necessarily need to be positioned above the bottom holder 24.

The top holder 23 includes cylindrical holding portions 23A corresponding to the number of the lithium ion secondary battery cells 21A. In an embodiment, the holding portions 23A are provided independently of each other. The holding portions 23A respectively hold the vicinities of the electrode portions 21B on one side. In addition, holes 23B are provided respectively on end surfaces of the holding portions 23A. A metal tab (not illustrated) is attached to the top holder 23 at the side opposite to the holding portions 23A. The tab is welded to the electrode portions 21B of the lithium ion secondary battery cells 21A exposed from the holes 23B. For example, a first tab is welded to four adjacent lithium ion secondary battery cells 21A, and a second tab is attached to two lithium ion secondary battery cells 21A located at the most end. The first tab attached to the two lithium ion secondary battery cells 21A located at the most end is connected to the output positive electrode terminal, and the second tab attached to the two lithium ion secondary battery cells 21A located at the most end is connected to the output negative electrode terminal.

The bottom holder 24 includes cylindrical holding portions 24A corresponding to the number of the lithium ion secondary battery cells 21A. In an embodiment, the holding portions 24A are disposed independently of each other. The holding portions 24A respectively hold the vicinities of the electrode portions 21B on the other side. In addition, holes 24B are provided respectively on end surfaces of the holding portions 24A. A metal tab (not illustrated) is attached to the bottom holder 24 at the side opposite to the holding portions 24A. For example, the tab is attached to the bottom holder 24 similarly to the tab attached to the top holder 23. In an embodiment, the top holder 23 and the bottom holder 24 correspond to a first battery holder that holds the portion including the electrode portions 21B of the battery 21. More specifically, the top holder 23 corresponds to a third battery holder, and the bottom holder 24 corresponds to a fourth battery holder. The top holder 23 may correspond to the fourth battery holder, and the bottom holder 24 may correspond to the third battery holder.

Figure 3:
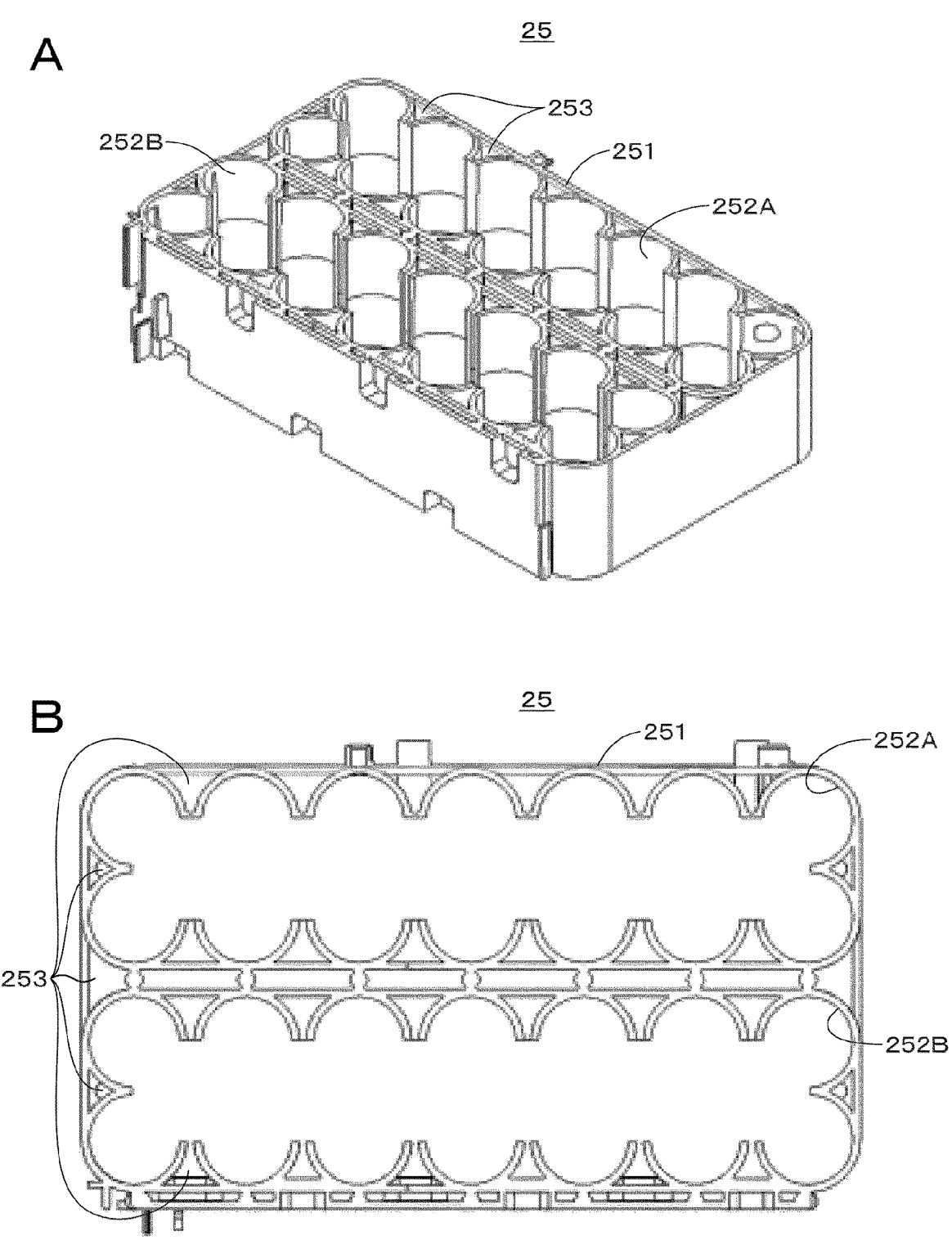
FIG. 3 illustrates view A and B which are diagrams relating to a middle holder according to an embodiment.

The middle holder 25, which is an example of the second battery holder, is a member surrounding a body portion of the battery 21. The body portion of the battery 21 means a portion near the center of the battery 21 not including the electrode portions 21B. A configuration example of the middle holder 25 will be described with reference to FIGS. 3A and 3B. FIG. 3A is a perspective view of the middle holder 25, and FIG. 3B is a top view of the middle holder 25.

The middle holder 25 has a side wall portion 251 having a substantially rectangular shape from a top view. On the inner side of the side wall portion 251, a holding portion 252A and a holding portion 252B are formed with the portions 252A and 252B being separated around the center in a lateral direction. The holding portion 252A has a shape in which 10 semi-cylindrical shapes and two substantially cylindrical shapes located at both ends are integrally formed. The fourteen lithium ion secondary battery cells 21A are held by respectively coming in contact with the cylindrical portions or substantially cylindrical portions of the holding portion 252A. Further, the holding portion 252B has a shape in which ten semi-cylindrical shapes and two substantially cylindrical shapes located at both ends are integrally formed. The residual fourteen lithium ion secondary battery cells 21A are held by respectively coming in contact with the cylindrical portions or substantially cylindrical portions of the holding portion 252B.

Holes 253 each having a substantially mountain shape from a top view are respectively provided between arc-shaped peripheral walls of the holding portion 252A, between arc-shaped peripheral walls of the holding portion 252B, and between the arc-shaped peripheral walls of the holding portion 252A and the arc-shaped peripheral walls of the holding portion 252B. In an embodiment, the 30 holes 253 are provided.

A pool portion and a heat absorbing portion will be described below. The middle holder 25 described above includes the pool portion. In an embodiment, the pool portion houses a heat absorbing portion (may be a member or a spatial position).

Here, the heat absorbing portion is also referred to as a heat storage latent heat portion, and is configured to absorb heat by performing phase change (for example, melting and solidification (crystallization)). Examples of a material constituting the heat absorbing portion include various salts such as alkali, and alkaline earth hydroxide and nitrate, hydrates such as sodium acetate trihydrate, various paraffins, metals such as aluminum fatty acid and copper, magnesium nitrate hexahydrate and magnesium chloride hexahydrate, a lauric acid-capric acid mixture, an ammonium nitrate-urea mixture, a Fe—Co alloy single such as a polyethylene glycol copolymer crosslinked composition, and the like. In an embodiment, the phase needs to quickly change with respect to sudden heat generation of the battery to absorb heat of the battery, and thus a material having a melting point of 50° C. to 60° C. is preferably used. Further, in an embodiment, a plurality of microcapsule assemblies containing a phase change material (PCM) is used as the heat absorbing portion. As the PCM, paraffins are preferably used according to an embodiment. This is because the latent heat amount is large. Examples of the type of microcapsule include a melamine resin type and a non-formalin type. Examples of the appearance thereof include milky white slurry (liquid having viscosity), viscous gel, and powder.

Figure 4:
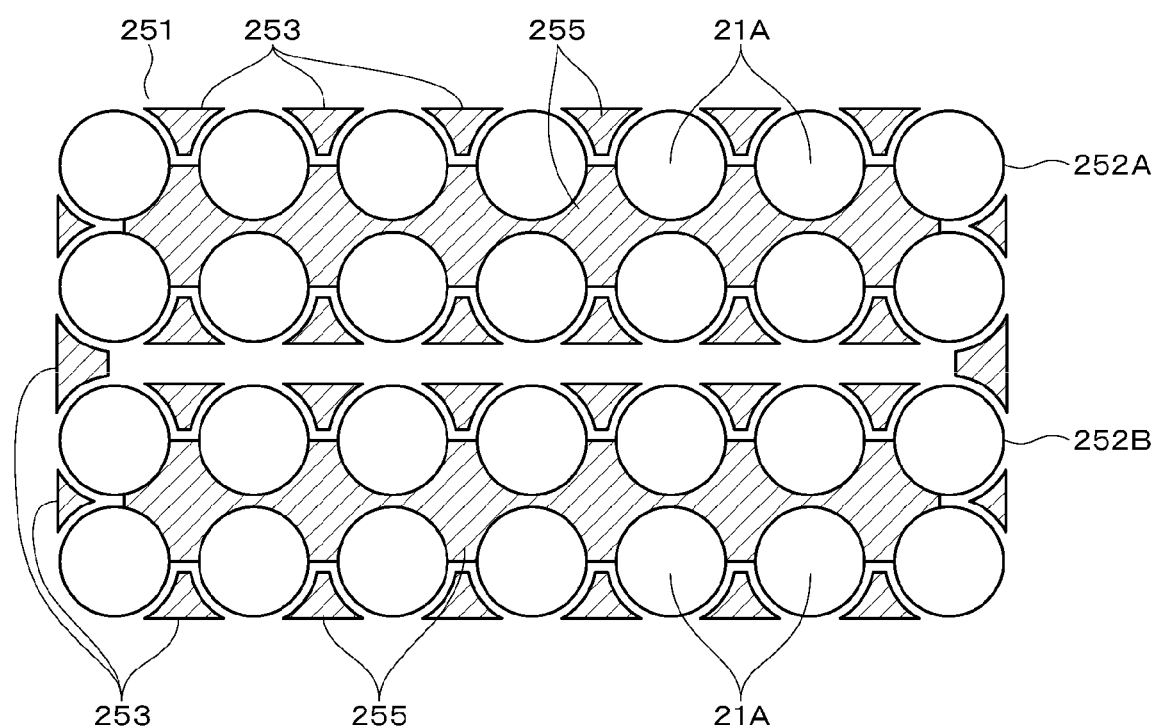
FIG. 4 is a diagram relating to a pool portion according to an embodiment.

FIG. 4 is a diagram for describing the pool portions (pool portions 255) according to an embodiment. FIG. 4 is a top view of a state where the body portion of the respective lithium ion secondary battery cells 21A are held by the middle holder 25. In an embodiment, the pool portions 255 are formed between the plurality of held lithium ion secondary battery cells 21A and in the holes 253. In FIG. 4, locations of the pool portions 255 are hatched.

Figure 5:
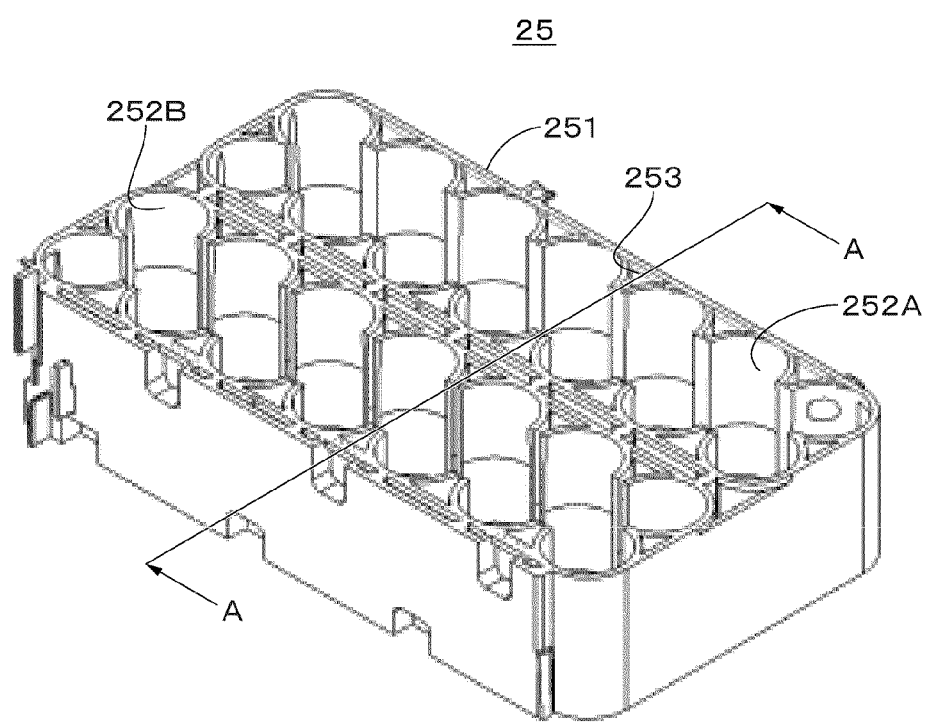
FIG. 5 is a view relating to a heat absorbing portion according to an embodiment.
Figure 6:
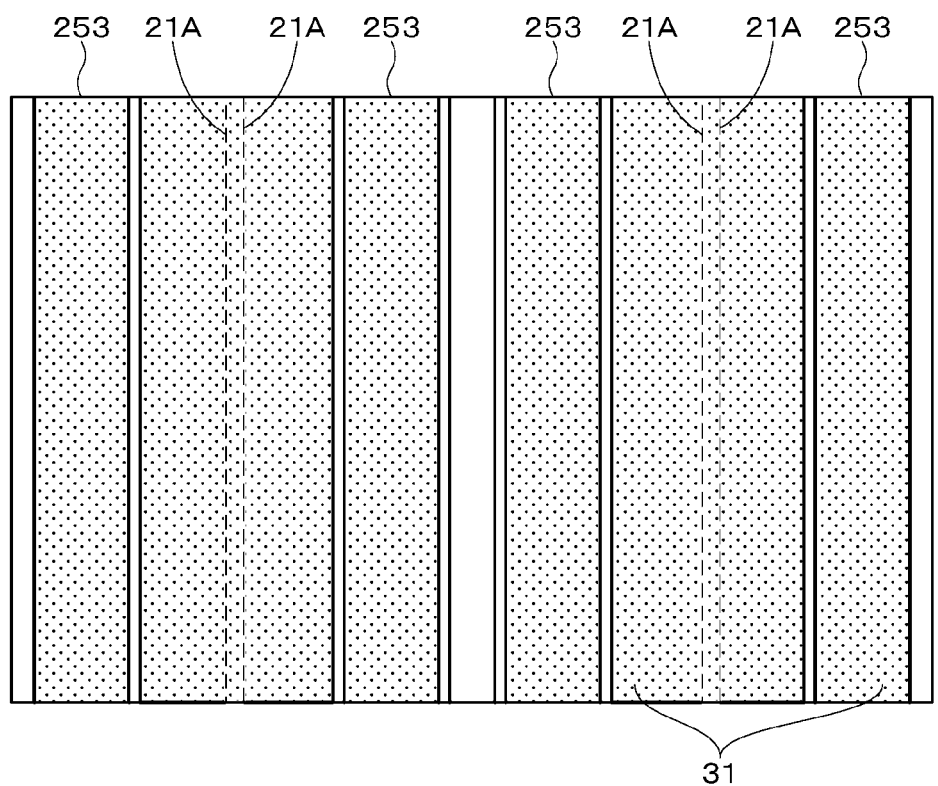
FIG. 6 is a diagram relating to the heat absorbing portion according to an embodiment.
Figure 7:
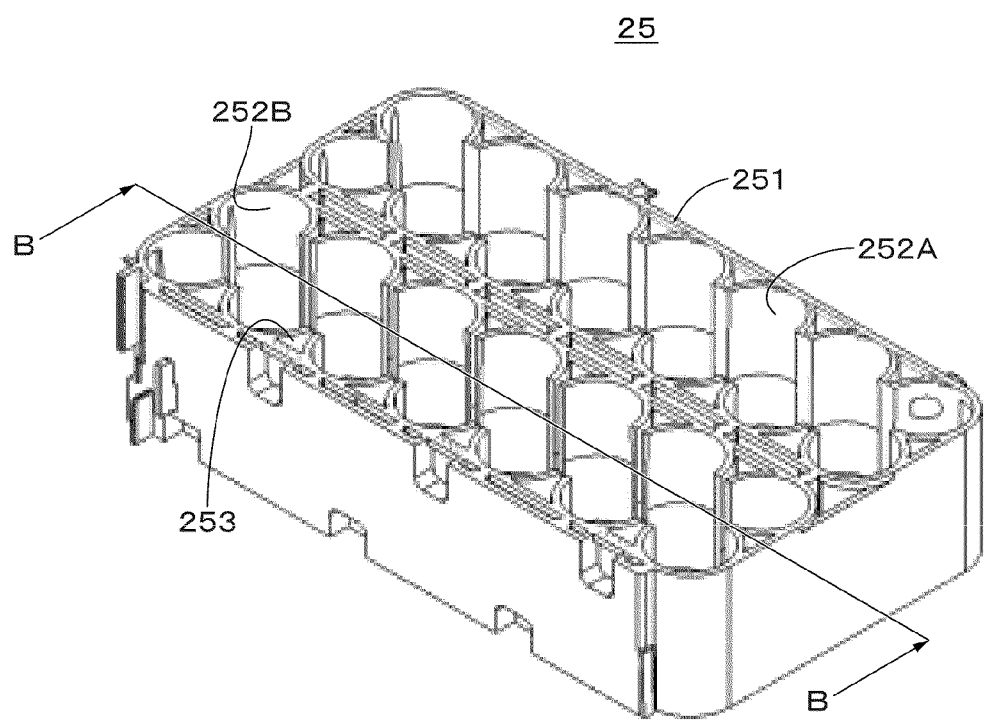
FIG. 7 is a diagram relating to the heat absorbing portion according to an embodiment.
Figure 8:
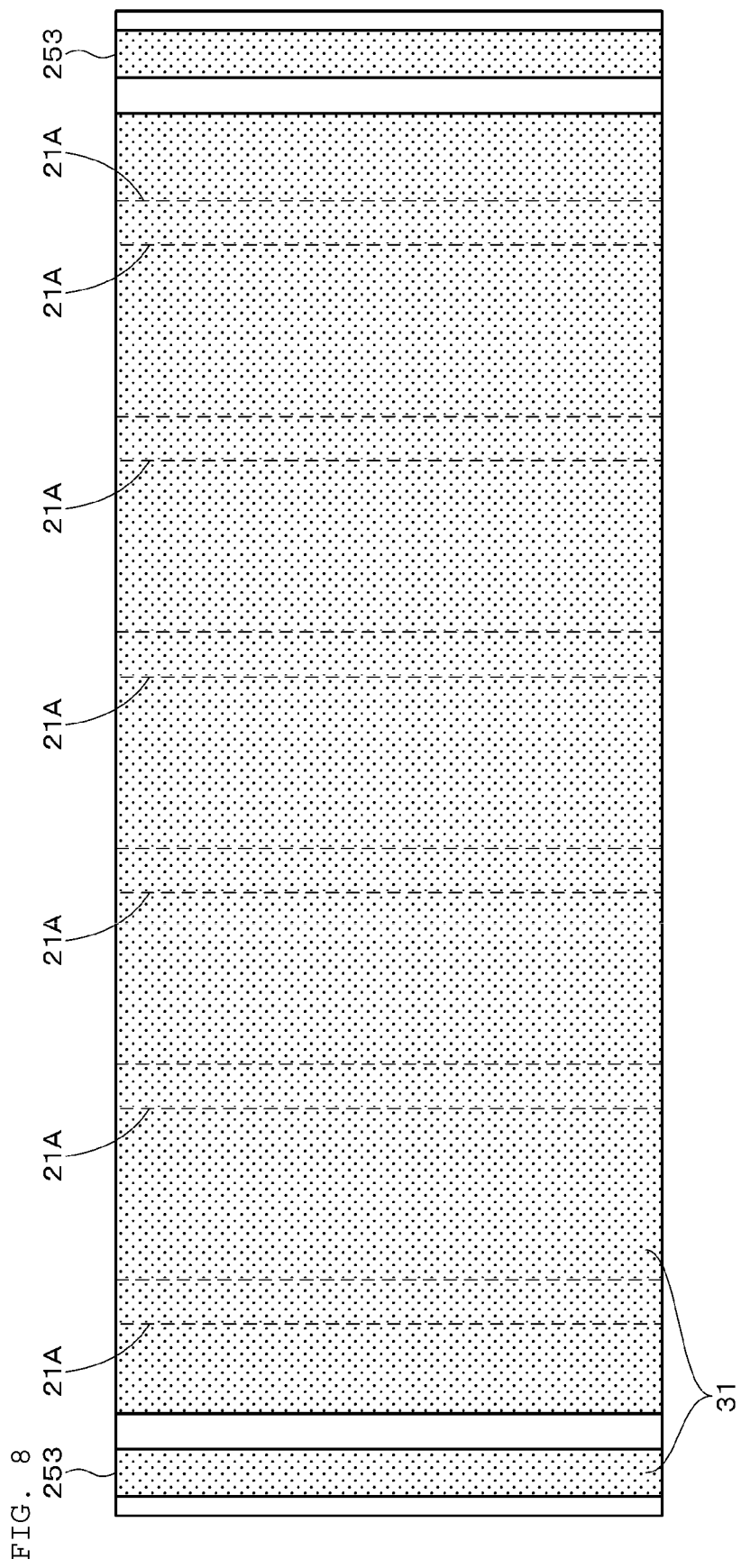
FIG. 8 is a diagram relating to the heat absorbing portion according to an embodiment.

The heat absorbing portion will be described below with reference to FIGS. 5 to 8. FIG. 6 is a sectional view of the middle holder 25 illustrated in FIG. 5 taken along line A-A. FIG. 8 is a sectional view of the middle holder 25 illustrated in FIG. 7 taken along line B-B. In FIGS. 5 and 7, illustration of the lithium ion secondary battery cells 21A is omitted. In FIGS. 6 and 8, the lithium ion secondary battery cells 21A are indicated by a broken line.

As illustrated in FIGS. 6 and 8, a plurality of the microcapsules (indicated by dotted hatching) containing a phase change substance is housed in the pool portions 255. The assembly of the microcapsules functions as the heat absorbing portion 31. The heat absorbing portion 31 absorbs heat in a case where the temperature of the battery 21 rises, and releases heat in a case where the temperature of the battery 21 drops. This makes it possible to prevent the battery pack 1 from being excessively heated.

Blocking portions included in the battery pack 1 will be described below. As described above, the heat absorbing portion 31 according to an embodiment includes the plurality of microcapsules. In an embodiment, the holding portions in each of the top holder 23 and the bottom holder 24 are disposed to be independent of each other, and spaces between the holding portions are flat. Thus, when the top holder 23, the bottom holder 24, and the middle holder 25 are integrated, the microcapsules constituting the heat absorbing portion 31 can be prevented from flowing into the top holder 23 and the bottom holder 24 side. However, in a case where the microcapsules may be very small (for example, 10 μm to 20 μm), the microcapsules may flow through slight gaps between the top holder 23 or the bottom holder 24 and the lithium ion secondary battery cells 21A, and the microcapsules that have flowed in may reaches the electrode portions 21B. This may cause a micro-short, a connection failure between the electrode portions and the tabs, or the like. Therefore, in an embodiment, blocking portions are disposed between the electrode portions 21B of the battery 21 and the pool portions 255, and the microcapsules constituting the heat absorbing portion 31 are prevented from reaching the electrode portions 21B by the blocking portions. In an embodiment, the above-described elastic members 21C and 21D function as the blocking portions.

Figure 9:
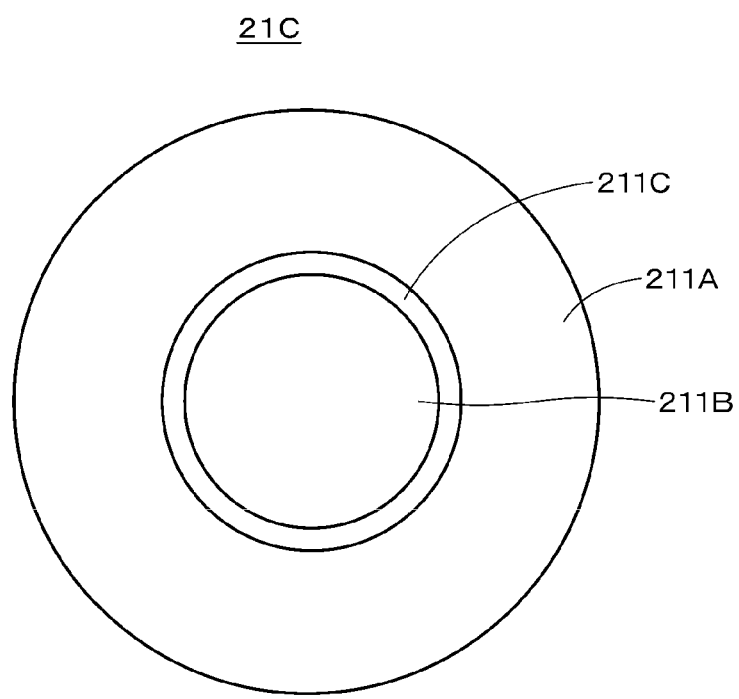
FIG. 9 is a diagram illustrating an elastic member according to an embodiment.

FIG. 9 is a diagram illustrating the elastic member 21C according to an embodiment. The elastic member 21D also has the same shape as the elastic member 21C. The elastic member 21C has a ring-shaped base 211A in which a circular hole 211B is formed at the center. A projection 211C that projects with respect to one main surface of the base 211A is formed near the peripheral edge of the hole 211B in the base 211A.

Figure 10:
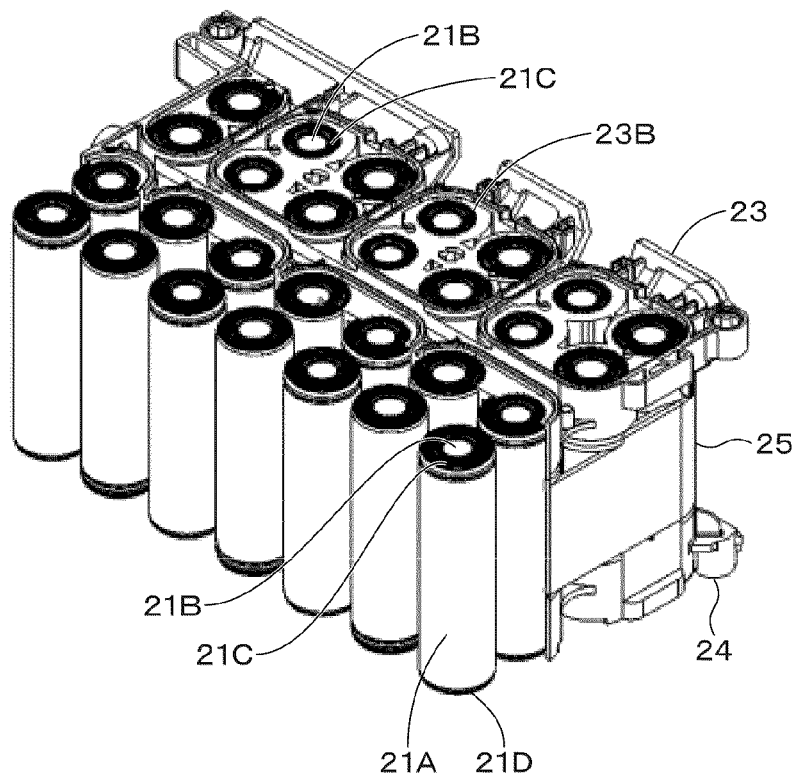
FIG. 10 is a diagram illustrating a state where the elastic member is attached to a battery according to an embodiment.
Figure 11:
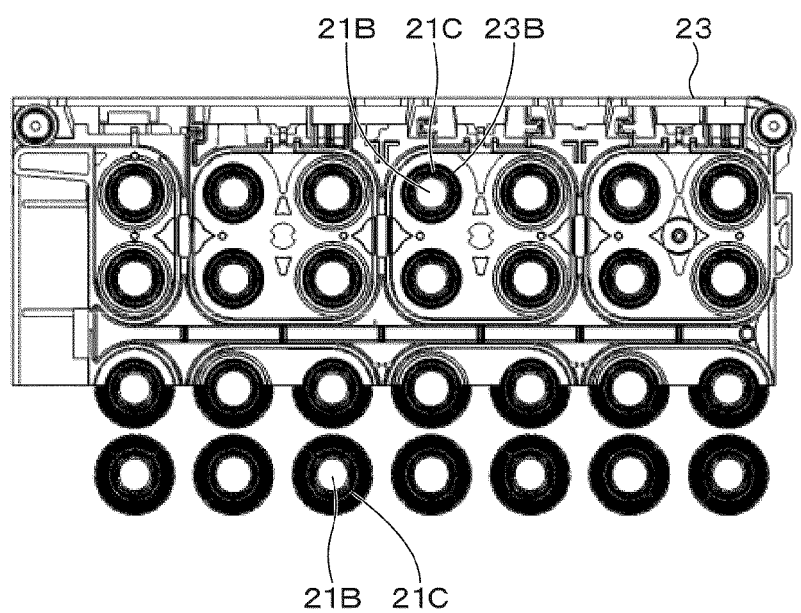
FIG. 11 is a diagram illustrating a state where the elastic member is attached to the battery according to an embodiment.

FIGS. 10 and 11 are diagrams illustrating the battery 21 housed and held in battery holder 22. FIGS. 10 and 11 illustrate, for easy understanding, a state where some of the lithium ion secondary battery cells 21A constituting the battery 21 are housed and held in the battery holder 22, and the other lithium ion secondary battery cells 21A are not housed in the battery holder 22.

As described above, the elastic members 21C are disposed to respectively surround the electrode portions 21B of the lithium ion secondary battery cells 21A positioned on the top holder 23 side. The electrode portions 21B are respectively exposed from the holes 211B of the elastic members 21C. In addition, the elastic members 21D are disposed to respectively surround the electrode portions 21B of the lithium ion secondary battery cells 21A positioned on the bottom holder 24 side. The electrode portions 21B are respectively exposed from the holes of the elastic members 21D. In a state where the battery 21 is housed and held in the top holder 23, the electrode portions 21B located on the top holder 23 side and the projections 211C of the elastic members 21C are respectively exposed to the outside from holes 23B of the top holder 23. Further, in a state where the battery 21 is housed and held in the bottom holder 24, the electrode portions 21B located on the bottom holder 24 side and the projections of the elastic members 21D are respectively exposed to the outside from holes 24B of the bottom holder 24.

Figure 12:
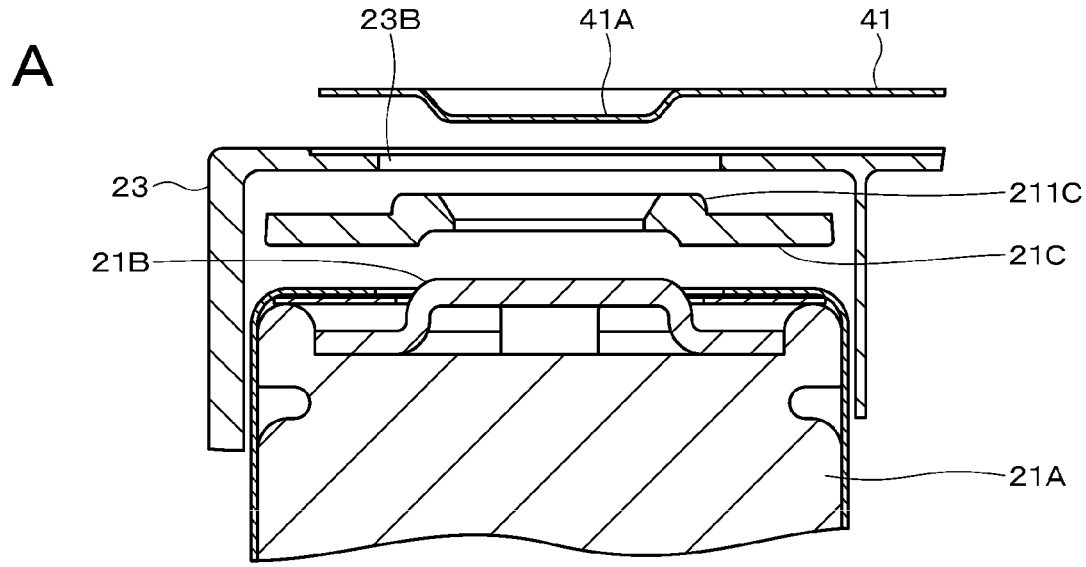
FIG. 12 illustrates views A and B which are diagrams relating to the function of the elastic member according to an embodiment is described.
Figure 12:
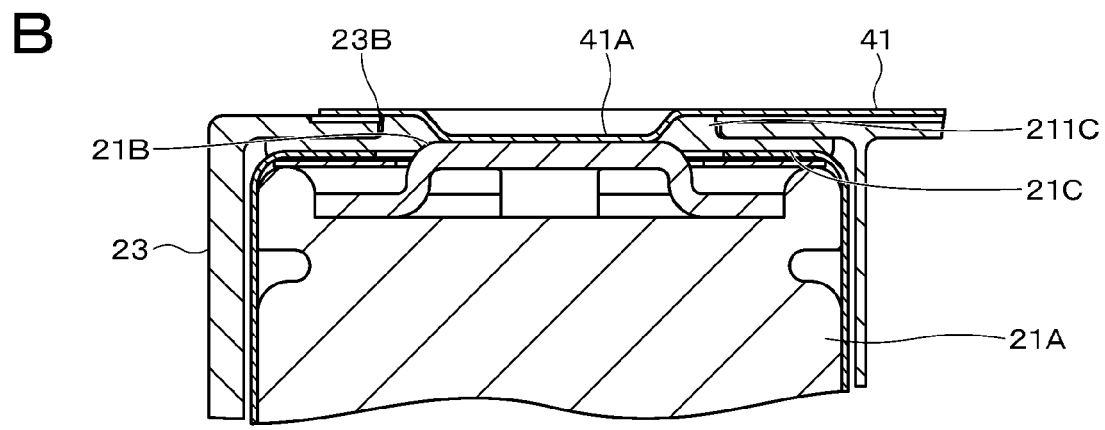

FIG. 12A is a sectional view illustrating a section of a state before the predetermined lithium ion secondary battery cell 21A located at the end, the top holder 23, the elastic member 21C, and the tab 41 are attached. FIG. 12B is a view illustrating a section of a state where these components are attached. A projection 41A is formed on the tab 41 which is a plate-shaped member made of metal.

As illustrated in FIG. 12B, the base 211A of the elastic member 21C is compressed by the inner surface of the top holder 23 and the lithium ion secondary battery cell 21A. At this time, the electrode portion 21B (in this example, the positive electrode terminal) and the projection 211C of the elastic member 21C are exposed to the outside from the hole 23B of the top holder 23. The projection 41A of the tab 41 is welded to the electrode portion 21B exposed to the outside. After the welding, the tab 41 and the lithium ion secondary battery cell 21A compress the projection 211C of the elastic member 21C.

The elastic member 21C blocks a path between the electrode portion 21B of the lithium ion secondary battery cell 21A and the middle holder 25, in other words, a path leading to the electrode portion 21B. As a result, where the microcapsules constituting the heat absorbing portion 31 flow in via the middle holder 25 side, it is possible to prevent the microcapsules from reaching the electrode portions 21B, and to prevent the above-described disadvantage from occurring.

The function of the elastic members 21C described above is similarly applied to the elastic members 21C and the elastic members 21D attached to the lithium ion secondary battery cells 21A disposed at the other positions.

As described herein, the following effects can be obtained according to an embodiment.

The heat absorbing portion can effectively cool the battery having a high temperature. In addition, the heat absorbing portion is disposed in a battery holder. As a result, a configuration such as a container for disposing the heat absorbing portion does not have to be added, and thus an increase in size and an increase in weight of the battery pack can be prevented. In addition, since the number of batteries does not have to be reduced for disposing the heat absorbing portion, a decrease in volume energy density can be prevent.

Incidentally, in order to effectively cool the battery having a high temperature, it is desirable that the heat absorbing portion comes in contact with the periphery of the battery as much as possible. On the other hand, from the viewpoint of impact resistance and safety of the battery pack, a structure capable of holding the battery more firmly is desired. In an embodiment, the battery holder is divided into the top holder, the bottom holder, and the middle holder, and the whole periphery of the battery is firmly held by the top holder and the bottom holder. In the middle holder, a contact area between the battery and the heat absorbing portion is made as large as possible. As described above, the top holder and the bottom holder are configured to have a battery holding function, and the middle holder is configured to have a heat absorbing function. This configuration makes it possible to prevent deterioration in impact resistance and safety of the battery pack as much as possible while effectively cooling the battery having a high temperature. Furthermore, by providing the blocking portions, it is possible to prevent inconvenience caused by the heat absorbing portion reaching the electrode portions of the battery.

While present application has been described herein, the contents of the present application are not to be considered limited thereto, and it is possible to make various modifications thereof.

Figure 13:
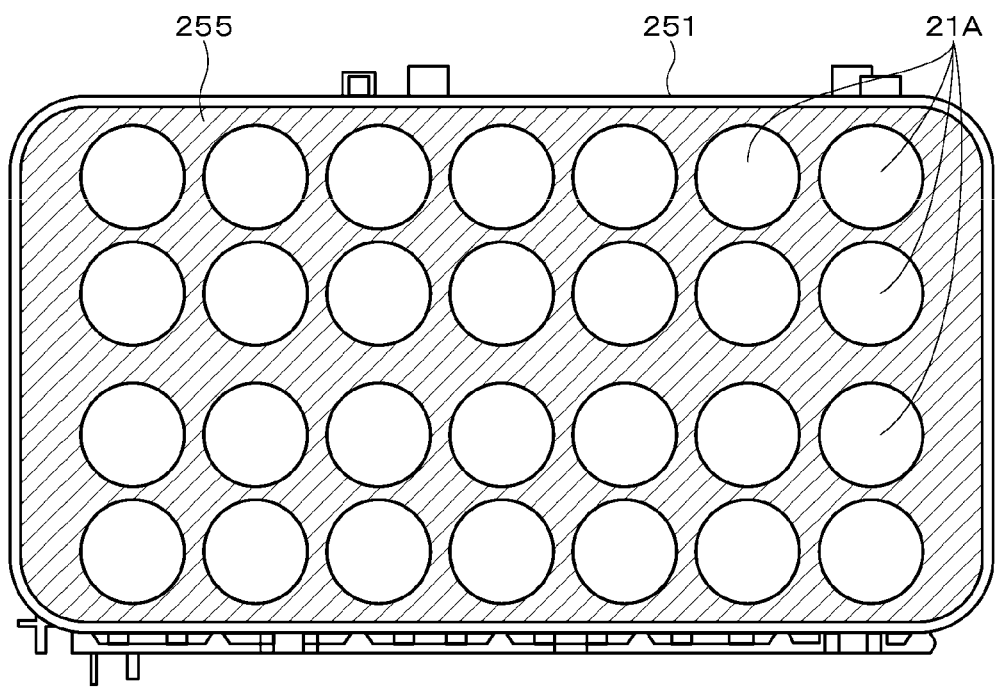
FIG. 13 is diagram according to an embodiment.

First, a modification of the holding portions of the middle holder will be described. As illustrated in FIG. 13, the middle holder 25 and the battery 21 may not be in contact with each other. In this case, a hatched portion in the space between the lithium ion secondary battery cells 21A functions as the pool portion 255 according to the present modification. Then, the microcapsules constituting the heat absorbing portion are housed in the pool portion 255. In the present modification, the assembly of the microcapsules functions as the heat absorbing portion and the holding portion. According to the present modification, when the contact area between the battery 21 and the heat absorbing portion is increased, the battery can be cooled more effectively.

Figure 14:
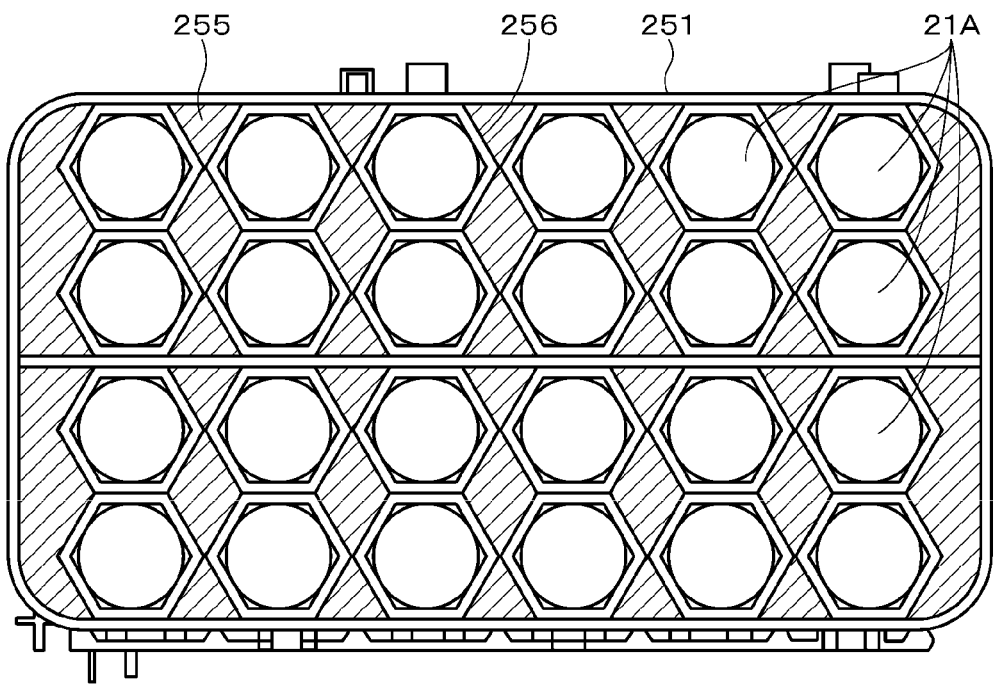
FIG. 14 is diagram according to an embodiment.

FIG. 14 illustrates another example of the holding portions of the middle holder 25. For example, as illustrated in FIG. 14, the holding portions (holding portions 256) according to the present modification each have a substantially hexagonal tube shape. The lithium ion secondary battery cells 21A are respectively housed in the holding portions 256. Hatched portions in the spaces outside the holding portions 256 function as the pool portions 255 according to the present modification. Then, the microcapsules constituting the heat absorbing portion are housed in the pool portion 255.

Figure 15:
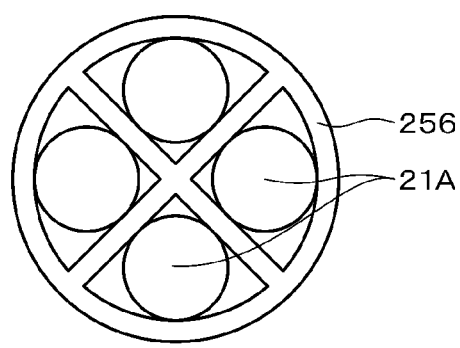
FIG. 15 illustrates views A to D which are diagrams according to an embodiment.
Figure 15:
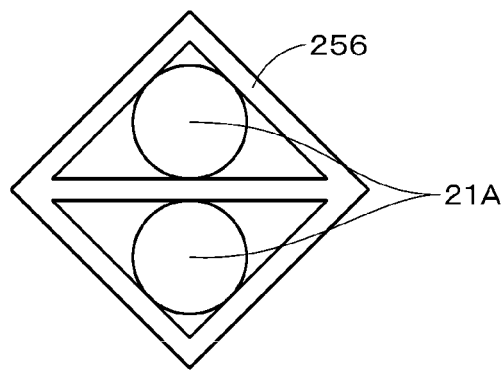
Figure 15:
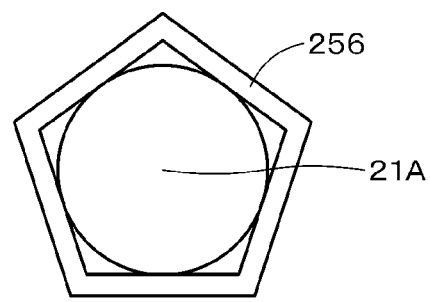
Figure 15:
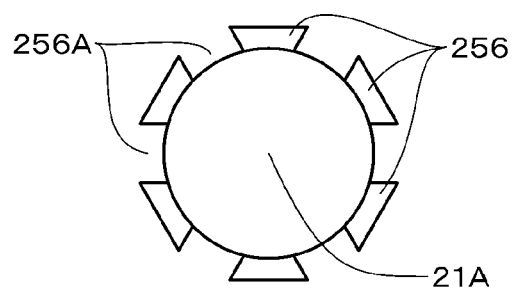

As illustrated in FIG. 15A, the holding portions 256 each may be a fan-shaped tube obtained by dividing a substantially cylindrical body into four parts. The lithium ion secondary battery cells 21A are respectively housed in the fan-shaped tubes. Spaces outside the holding portions 256 function as the pool portions 255 according to the present modification. Microcapsules constituting the heat absorbing portion are respectively housed in the pool portions 255.

As illustrated in FIG. 15B, the holding portions 256 each may be a substantially triangular tube obtained by dividing a substantially regular square tube into two parts. The lithium ion secondary battery cells 21A are housed in the substantially regular square tube. Spaces outside the holding portions 256 function as the pool portions 255 according to the present modification. Then, the microcapsules constituting the heat absorbing portion are housed in the pool portion 255.

As illustrated in FIG. 15C, the holding portions 256 each may be a substantially regular pentagonal pipe. The lithium ion secondary battery cells 21A are respectively housed in the substantially regular square pipes. Spaces outside the holding portions 256 function as the pool portions 255 according to the present modification. Then, the microcapsules constituting the heat absorbing portion are housed in the pool portion 255.

As illustrated in FIG. 14 and FIGS. 15A to 15C, the lithium ion secondary battery cells 21A are preferably held with the cells respectively coming in point contact with the holding portions 256 according to an embodiment. As a result, the motion of the lithium ion secondary battery cells 21A can be effectively prevented, and the holding states the lithium ion secondary battery cells 21A can be improved. A heat absorbing portion may be disposed also inside the holding portions 256.

The holding portions 256 may be an assembly of separated constituents instead of a continuous constituent. For example, as illustrated in FIG. 15D, six tubular bodies in contact with each of the lithium ion secondary battery cells 21A may be the holding portions 256. With the separated configuration, the holding portions 256 include a plurality of slits 256A. Each of the lithium ion secondary battery cells 21A can be brought into direct contact with the heat absorbing portion with the slits 256A interposed therebetween. This makes it possible to improve the holding property with respect to each of the lithium ion secondary battery cells 21A, and to effectively cool each of the lithium ion secondary battery cells 21A having a high temperature.

Figure 16:
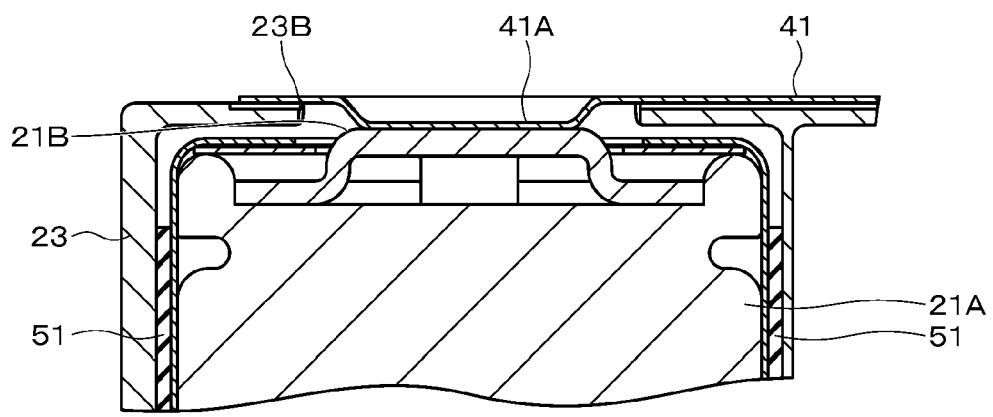
FIG. 16 is diagram according to an embodiment.

As described herein, the elastic members 21C and 21D function as the blocking portions, but the present application is not limited thereto. For example, a resin disposed (filled) between the top holder and the battery and a resin disposed between the bottom holder and the battery may be the blocking portions. As illustrated in FIG. 16, for example, gaps between the top holder 23 and the predetermined lithium ion secondary battery cells 21A constituting the battery 21 are filled with a potting resin 51. The cured potting resin 51 can prevent the microcapsules constituting the heat absorbing portion from reaching the electrode portions 21B. For example, an injection hole is provided in the top holder 23 or the bottom holder 24, and the potting resin 51 is injected through the injection hole. As the blocking portions, both the elastic member and the potting resin may be used. Note that as the potting resin, a urethane resin, an epoxy resin, a silicon resin, an acrylic resin, or the like can be used.

Other modifications will be described. For example, a frame-shaped elastic member (an example of a second elastic member) may be disposed near the peripheral edge with which the top holder 23 and the middle holder 25 are engaged, and may be compressed to be sandwiched when both the holders are integrated. Further, for example, a frame-shaped elastic member may be disposed near the peripheral edge with which the bottom holder 24 and the middle holder 25 are engaged, and may be compressed to be sandwiched when both the holders are integrated. This makes it possible to prevent entry of foreign matter into the battery holder 22 and to prevent the microcapsules constituting the heat absorbing portion 31 from leaking out of the battery holder 22.

The heat absorbing portion may be constituted by slurry or powder instead of microcapsules. In addition, the heat absorbing portion may contain a substance, such as sodium hydrogen carbonate, that generates a dehydration endothermic reaction. Accordingly, the safety of the battery pack can be further improved.

A projection may be formed on a peripheral edge of the exterior upper case 10A, a groove into which the projection enters may be formed on a peripheral edge of the exterior lower case 10B, and an O-ring made of an elastic member may be housed in the groove. When the exterior upper case 10A and the exterior lower case 10B are integrated, the O-ring may be compressed by the projection of the exterior upper case 10A. This makes it possible to prevent foreign matter such as moisture from entering the exterior case 10. The exterior case 10 may be a double case.

Each of the top holder 23, the bottom holder 24, and the middle holder 25 is not limited to a single holder, and may be configured by a plurality of holders. The matters described in the above embodiment and modifications can be appropriately combined. In addition, the numerical values, materials, processes, and the like described in the embodiment are considered merely by way of example, and the contents of the present application are not to be considered limited to the exemplified numerical values and the like.

Figure 17:
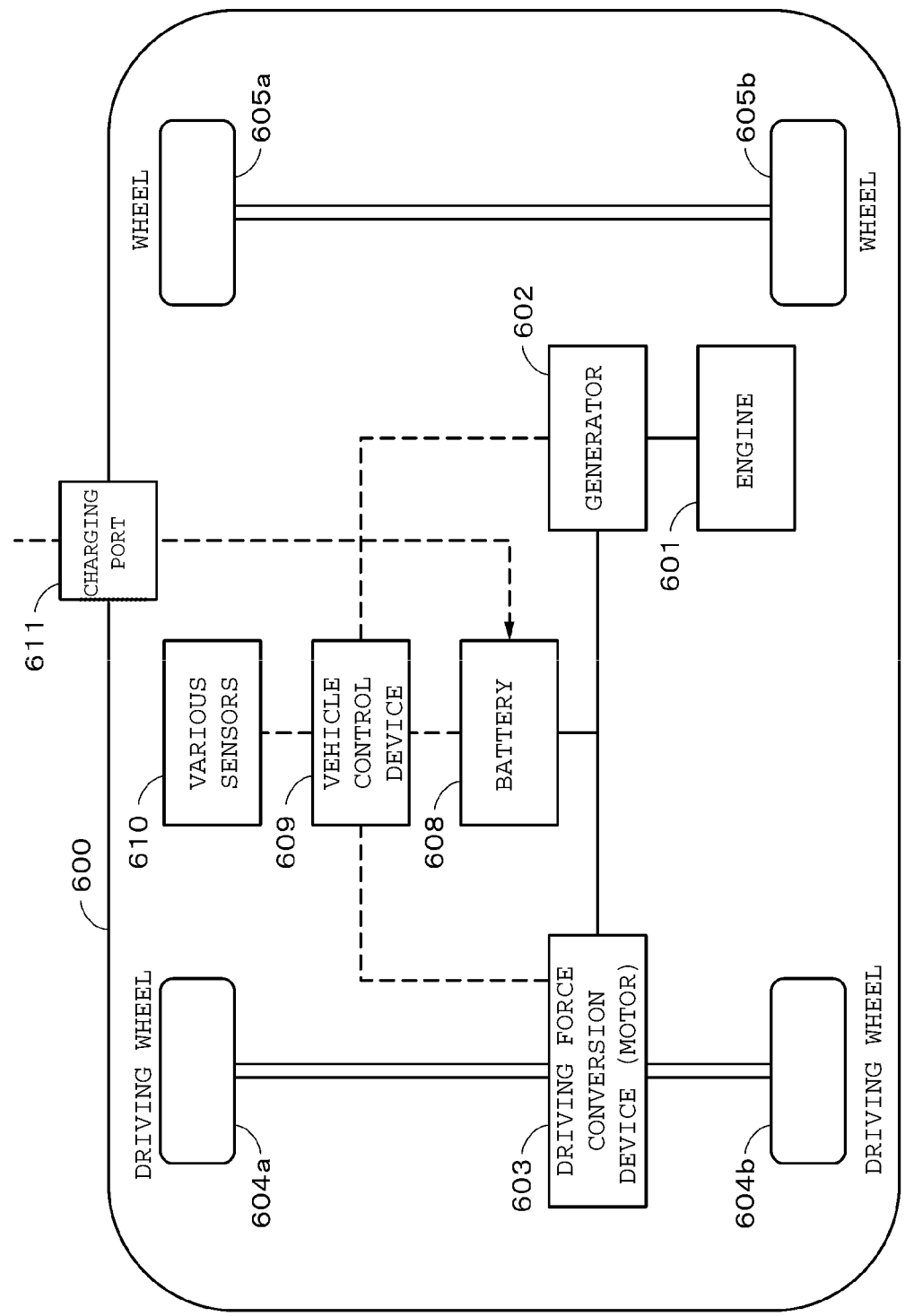
FIG. 17 is a diagram according to an embodiment.

Next, an application example to which the battery pack of the present application can be applied will be described. As an example in which the present application is applied to an electric vehicle power storage system, FIG. 17 schematically illustrates a configuration example of a hybrid vehicle (HV) employing a series hybrid system. The series hybrid system is a car travelling with an electric power-driving force conversion device using electric power generated by a generator powered by an engine or electric power obtained by temporarily storing the generated electric power in a battery.

A hybrid vehicle 600 carries an engine 601, a generator 602, the electric power-driving force conversion device (direct-current motor or alternate-current motor; hereinafter, referred to simply as a "motor 603"), a driving wheel 604a, a driving wheel 604b, a wheel 605a, a wheel 605b, a battery 608, a vehicle control device 609, various sensors 610, and a charging port 611. As the battery 608, the battery pack of the present application can be applied.

The motor 603 is operated by the electric power of the battery 608, and a rotating force of the motor 603 is transmitted to the driving wheels 604a and 604b. The battery 608 can store the electric power generated at the generator 602 by the rotational force produced by the engine 601. The various sensors 610 control an engine speed using the vehicle control device 609, or control an opening degree of a throttle valve, not illustrated.

When the hybrid vehicle 600 is decelerated by a brake mechanism, not illustrated, a resistance force during the deceleration is added as a rotating force to the motor 603, and regenerative electric power generated due to this rotating force is stored in the battery 608. The battery 608 can be charged by being connected to an external power supply via the charging port 611 of the hybrid vehicle 600. Such an HV vehicle is referred to as a plug-in hybrid vehicle (PHV or PHEV).

It is to be noted that the secondary battery of the present application can also be applied to a downsized primary battery, and then used as a power supply for a pneumatic sensor system (tire pressure monitoring system (TPMS)) built in the wheels 604 and 605.

Although a series hybrid vehicle has been described above as an example, the present application is also applicable to a vehicle of a parallel system using an engine and a motor together or a hybrid vehicle in which a series system and a parallel system are combined. In addition, the present application is also applicable to an electric vehicle (EV or BEV) and a fuel cell vehicle (FCV) that travel only by a drive motor without using an engine.

Figure 18:
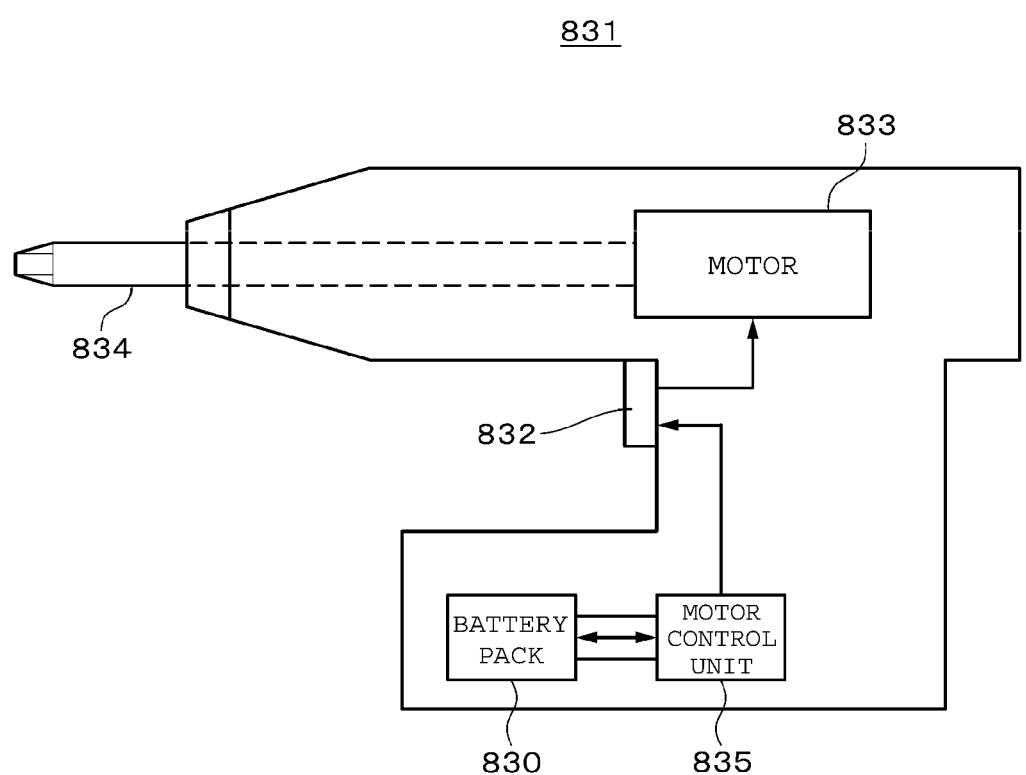
FIG. 18 is a diagram for describing an application example according to an embodiment.

First, an example of an electric driver as an electric tool to which the present applicable is applicable will be schematically described with reference to FIG. 18. An electric driver 831 is provided with a motor 833 that transmits rotative power to a shaft 834 and a trigger switch 832 to be operated by a user. A battery pack 830 according to the present application and a motor control unit 835 are housed in a lower housing of a handle of the electric driver 831. The battery pack 830 is built in the electric driver 831, or detachable from the electric driver 831.

The battery pack 830 and the motor control unit 835 each may include a microcomputer (not illustrated), such that charge/discharge information of the battery pack 830 can be communicated with each other. The motor control unit 835 can control the operation of the motor 833, and cut off the power supply to the motor 833 at the time of abnormality such as overdischarge.

DESCRIPTION OF REFERENCE SYMBOLS

1: Battery pack
10: Exterior case
23: Top holder
24: Bottom holder
25: Middle holder
21: Battery
21A: Lithium ion secondary battery cell
21B: Electrode portion
21C, 21D: Elastic member 31: Heat absorbing portion
51: Potting resin
252A, 252B: Holding portion
255: Pool portion
256: Holding portion
256A: Slit It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
an exterior case;
a battery;
a battery holder; and
a heat absorbing portion, wherein
wherein the heat absorbing portion is configured to absorb heat by a phase change,
wherein the battery holder includes a first battery holder that holds a first electrode end portion of the battery, a second battery holder that surrounds a body portion of the battery, and a third battery holder that holds a second electrode end portion of the battery,
wherein the second battery holder includes a pool portion,
wherein the heat absorbing portion is housed in the pool portion,
wherein between the first electrode end portion and the pool portion and between the second electrode end portion and the pool portion, a blocking portion is disposed,
wherein the blocking portion includes a first elastic member that surrounds the electrode portion,
wherein the blocking portion includes a resin disposed between the first battery holder and the battery, and
wherein the first elastic member of the blocking portion includes a projection that projects with respect to a main surface of a base of the first elastic member.

2. The battery pack according to claim 1, wherein
the battery is a cylindrical battery having the first electrode end portion and the second electrode end portion, and
the second battery holder is disposed to be sandwiched between the the first battery holder and the third battery holder.

3. The battery pack according to claim 2, wherein
the battery holder holds a plurality of batteries, and
the pool portion is disposed between the plurality of batteries.

4. The battery pack according to claim 1, wherein the second battery holder includes a holding portion that comes in contact with the battery.

5. The battery pack according to claim 4, wherein the holding portion includes a plurality of slits.

6. The battery pack according to claim 1, wherein the battery holder includes a second elastic member sandwiched between the first battery holder and the second battery holder and between the third battery holder and the second battery holder.

7. The battery pack according to claim 1, wherein the heat absorbing portion includes paraffin.

8. The battery pack according to claim 1, wherein the heat absorbing portion includes a plurality of microcapsules containing a phase change substance.

9. An electric tool comprising the battery pack according to claim 1.

10. An electric vehicle comprising the battery pack according to claim 1.

* * * * *